United States Patent Office 3,349,054
Patented Oct. 24, 1967

3,349,054
TEXTILE DECORATING METHODS USING CURABLE POLYMERIC COMPOSITIONS CONTAINING MIXTURES OF POLYCYCLOALIPHATIC POLYEPOXIDE AND TRIAZINE
George J. Leitner, Peekskill, and Eduard K. Kleiner, New York, N.Y., assignors to Geigy Chemical Corporation, Greenburgh, N.Y., a corporation of Delaware
No Drawing. Filed Oct. 21, 1964, Ser. No. 405,583
15 Claims. (Cl. 260—29.6)

The present invention relates to novel polymeric compositions, to compositions employed in and processes for the preparation of such polymeric compositions, and to methods for the use of such polymeric compositions. More particularly, the present invention pertains to a heat curable resinous composition of novel crosslinkable interpolymers of styrene and certain derivatives of acrylic acid together with a novel crosslinking agent and to important applications in the textile arts of the resinous compositions thus obtained.

One of the prevailing problems in the textile art is the need for a pigment binder satisfying numerous and clearly defined requirements. A suitable binder must be easy to handle during the printing or coloring operation, must not require drastic curing conditions and, once cured, must exhibit a high degree of adhesion, abrasion resistance and crock fastness, together with resistance to and durability during solvent dry cleaning and alkaline and acid wash.

The search for suitable binders in the textile art has also been complicated by the advent of synthetic fibers of organic and inorganic origin. These synthetic fibers have made possible a multitude of new fabrics which are often blends of different fibers, so woven as to create a variety of textures, lusters and weaves. Hence with such fibers as polyesters, polyamides, celluloses, glass, polyacrylics and the like, as well as blends of these, being into taffetas, satins, tricots, twill, basket, sheer, voile, corduroy and other constructions, the problem of finding suitable binders of wide applications for both hydrophilic and hydrophobic fibers is extremely complicated. This problem is aggrevated even more by heat sensitivity during the cure since, unlike cottons, many of the synthetics cannot be subjected to the necessary elevated temperature cure cycles without demonstrating discoloration, shrinkage and/or distortion.

Among the many applications of the addition copolymers of acrylic and methacrylic acid has been their use in such binders. Generally, however, such binders are highly specific for a particular textile and for a particular use of that textile. Thus while certain acrylic binder compositions may be superior in terms of solvent resistance and wash durability, their degree of adhesion and abrasion resistance may be less than desired. Variations in the acrylic copolymer, both in the nature of the monomer and in the relative amounts of the monomers, in an effort to overcome such problems generally result in a sacrifice of one or more other desirable property.

According to the present invention, there is provided an improved binder which is a heat curable resinous composition comprising (a) a novel interpolymer of unsaturated monomers and (b) a novel crosslinking agent. This binder, upon cure, demonstrates superior resistance to washing, dry cleaning, scrubbing, abrasion and crocking, both wet and dry. The resinous binder of the present invention can also be used on a variety of fabrics, including synthetic wovens and non-wovens, thus permitting the use of a single binder system for numerous fabrics. Moreover, the binder system of the present invention is easy to apply and has low temperature setting or curing characteristics with no requirement for chemical catalysts, thus permitting, among other things, preservation of the integrity of the textile.

The interpolymer component of this binder consists of from about 25 to about 55% by weight of styrene, from about 45 to about 75% by weight of an alkyl ester of acrylic acid and from about 0.5 to about 10% of a reactive acrylic.

The alkyl acrylate monomer of this interpolymer will generally contain from 7 to 15 carbon atoms, the alkyl portion thus having from 4 to 12 carbon atoms. Typical of such alkyl acrylates are thus butyl acrylate, hexyl acrylate, 2-ethylhexyl acrylate, octyl acrylate, lauryl acrylate and the like. The preferred alkyl acrylate monomers are butyl acrylate and 2-ethylhexyl acrylate.

Reactive acrylic monomers are those derivatives of acrylic or methacrylic acid exhibiting a moiety which, as a pendant group on the resultant interpolymer, is capable of reacting with another compound so as to effect crosslinking. Such groups are well known and may be hydroxy as in the case of a hydroxyalkyl acrylate, carboxy as in the case of acrylic or methacrylic acid, epoxy as in the case of glycidyl methacrylate, methylolamido as in the case of N-methylolacrylamide or alkoxymethylamido as in the case of an etherified methylolacrylamide.

Preferred interpolymer compositions of the present invention contain from about 27 to about 50% styrene with from about 47 to about 70% of one or more alkyl acrylates and from about 0.5 to about 3% of one or more reactive acrylic. The relative amounts of each component are so selected that the final interpolymer demonstrates a glass transition temperature of from about −20 to about +5° C., preferably about −10° C. Glass transition temperature, a specific and characteristic property of individual polymers, is that temperature at which the polymer passes from a glassy to a rubbery state, as determined, for example, by measuring the torsional stiffness.

A particularly preferred interpolymer of the present invention is composed of about 42% styrene, about 56% 2-ethylhexyl acrylate and about 2% of one or more reactive acrylics, as, for example, 2% N-methylolacrylamide or 1% methacrylic acid and 1% methacrylamide.

The second component of the novel binder of the present invention is a mixture of a polycycloaliphatic polyepoxide and a 2,4,5-tris-[di-(lower-alkoxymethyl)amino]-1,3,5-triazine of the formula:

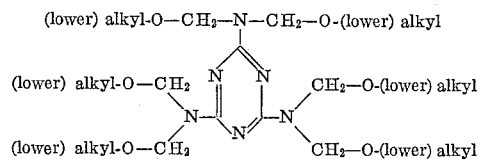

The preferred specie of this component is that compound wherein each of the (lower)alkyl groups is methyl, i.e. hexamethoxymethylmelamine, although those compounds having alkyl groups with from 2 to 4 carbon atoms may also be employed.

The polycycloaliphatic polyepoxide compounds in this second component are characterized by the presence of two or more cyclohexane and/or cyclopentane rings, each of which rings bears one or more epoxide groups. The preferred compounds of this class are 3,4-epoxy-6-methylcyclohexymethyl 3,4-epoxy-6-methylcyclohexanecarboxylate;
3,4-epoxycyclohexylmethyl 3,4-epoxycyclohexanecarboxylate;
bis-(3,4-epoxy-6-methylcyclohexylmethyl) adipate;
bis-(2,3-epoxycyclopentyl) ether;
1,2-bis-(2,3-epoxycyclopentyloxy)ethane; and
3-(3,4-epoxycyclohexyl)-9,10-epoxy-2,4-dioxaspiro [5,6]undecane.

Other polycycloaliphatic polyepoxides which are suitable are those disclosed in the following U.S. patents:

| | |
|---|---|
| 2,716,123 | 2,988,554 |
| 2,750,395 | 3,023,174 |
| 2,853,498 | 3,027,357 |
| 2,853,499 | 3,028,385 |
| 2,863,881 | 3,072,678 |
| 2,991,293 | 3,072,679 |

Each of these two types of compounds in this second components is known individually for its crosslinking properties. Each, however, is specific for certain types of reactive acrylics, depending upon pendant reactive groups which are present. While each type has certain advantages they also possess serious disadvantages. Surprisingly it has been found that a combination of a polycycloaliphatic polyepoxide with from about 10 to about 90% of the above triazine, generally 40 to 60% and preferably about 50%, can be used in a wide variety of interpolymers and results upon cure in a crosslinked resinous material far superior in properties to those which can be attributed to the additive properties of the individual compounds.

In practice, the interpolymer component is prepared from styrene, the alkyl acrylates and the reactive acrylics according to standard aqueous emulsion polymerization techniques. Alkyl mercaptans may be added to control molecular length, although not necessary. The product is obtained in the form of an aqueous emulsion containing from about 30 to about 65%, preferably about 40 to about 50% of the actual interpolymer, together with varying amounts of one or more surfactants.

To this emulsion is added from about 0.5 to about 30%, preferably 0.5 to 10%, by weight of interpolymer, of the mixture of the polycycloaliphatic polyepoxide and the hexa(lower)alkoxymethylmelamine. Minor amounts of surfactants may also be added to this. The amounts of the various components will depend of course not only upon the particular textile to be treated but also upon the method of treatment; e.g., padding liquor, print paste, etc. The final binder composition, either previously prepared or as prepared at the site of use, will also contain a color concentrate and an extender.

One feature of the present invention is found in the fact that the emulsion interpolymer is soluble or partly soluble in mineral spirits, a major component of the extender. As a result, high viscosity printing pastes can be obtained without the need for a thickening agent, a feature of particular interest for screen printing. The excellent dry crockfastness and wet crockfastness with excellent color stability of the composition is also surprising since previous compositions have generally exhibited dry crockfastness or wet crockfastness, but seldom both. In addition, the binder of the present invention actually improves the nature of the textile itself by contributing improved tensile and elongation properties to it.

After application to the fabric, either by padding, screen printing, roller printing or the like, the printed textile is cured. This curing is done in the usual fashion by heat, but in contrast to prior binders, the binder of the present invention utilizes shorter curing cycles at lower curing temperatures. Thus whereas cures have heretofore been effected at temperatures as high as 300° F. for periods of 30 minutes or longer, cures of the binder of the present invention can often be accomplished at temperatures as low as 180° to 220° F. for a period of less than 3 minutes, although higher temperatures can be used. As a result, a chemical catalyst is generally not required, although in some applications a latent acid catalyst may be added for even greater acceleration of the cure cycle. Such catalysts include, for example, ammonium chloride, ammonium nitrate, ammonium phosphate, ammonium sulfate, the morpholine salt of p-toluenesulfonic acid, volatile amine salts of mineral acids and the like.

The following examples, presented for purposes of illustration and not limitation, will serve to further typify the nature of this invention:

INTERPOLYMER COMPOSITION

The following represent typical interpolymer compositions, all percentages being by weight:

|  | Percent |
|---|---|
| *(a)* | |
| Styrene | 34 |
| n-Butyl acrylate | 64 |
| Methacrylamide | 2 |
| *(b)* | |
| Styrene | 42 |
| 2-ethylhexyl acrylate | 56 |
| N-methylolacrylamide | 2 |
| *(c)* | |
| Styrene | 40 |
| 2-ethylhexyl acrylate | 57 |
| 2-hydroxypropyl methacrylate | 3 |
| *(d)* | |
| Styrene | 42 |
| 2-ethylhexyl acrylate | 56 |
| Glycidyl methacrylate | 2 |
| *(e)* | |
| Styrene | 42 |
| 2-ethylhexyl acrylate | 55 |
| N-methylolacrylamide | 3 |
| *(f)* | |
| Styrene | 30 |
| n-Butyl acrylate | 66 |
| Methacylic acid | 2 |
| Methacrylamide | 2 |
| *(g)* | |
| Styrene | 30 |
| n-Butyl acrylate | 66 |
| Methacrylic acid | 2 |
| Glycidyl methacrylate | 2 |
| *(h)* | |
| Styrene | 42 |
| 2-ethylhexyl acrylate | 56 |
| Methacrylic acid | 2 |
| *(i)* | |
| Styrene | 43.5 |
| 2-ethylhexyl acrylate | 56.0 |
| N-methylolacrylamide | 0.5 |
| *(j)* | |
| Styrene | 34.9 |
| 2-ethylhexyl acrylate | 14.0 |
| n-Butyl acrylate | 49.1 |
| Glycidyl methacrylate | 2.0 |
| *(k)* | |
| Styrene | 25 |
| Lauryl acrylate | 70 |
| Methacrylic acid | 5 |
| *(l)* | |
| Styrene | 33 |
| 2-ethylhexyl acrylate | 62 |
| Hydroethyl acrylate | 2 |
| Methacrylic acid | 3 |
| *(m)* | |
| Styrene | 41 |
| n-Octyl acrylate | 56 |
| Methacrylamide | 3 |

Preparation of the interpolymers utilized in the present invention may be typified by the following general procedure.

The following ingredients are combined in a reaction vessel:

| | Parts |
|---|---|
| Deionized water | 98.85 |
| Sodium lauryl sulfate | 1.5 |
| Nonylphenoxypolyethyleneoxyethanol | 1.5 |
| Ammonium persulfate | 0.15 |

This aqueous charge is heated to 75° C. and a substantially equal amount by weight of the particular monomer mixture is then added with stirring under a blanket of nitrogen at a uniform rate over a two-hour period. During this time the reaction temperature usually increases about 5 to 8°. Upon completion of the addition, the reaction mixture is maintained at 85° C. with stirring for one hour. The product is then allowed to cool to room temperature and its pH adjusted to 8.5–9.0 by the addition of aqueous ammonium hydroxide.

CROSSLINKING COMPOSITIONS

| | Percent |
|---|---|
| *(a)* | |
| Hexamethoxymethylmelamine | 90 |
| 3,4-epoxy-6-methylcyclohexylmethyl-3,4 - epoxy - 6-methylcyclohexanecarboxylate | 10 |
| *(b)* | |
| Hexamethoxymethylmelamine | 40 |
| Bis-(3,4-epoxy-6-methylcyclohexyl)adipate | 40 |
| "Pluronic" L–61 surfactant | 20 |
| *(c)* | |
| Hexamethoxymethylmelamine | 50 |
| 3,4-epoxy-6-methylcyclohexylmethyl-3,4 - epoxy - 6-methylcyclohexanecarboxylate | 30 |
| Mineral spirits | 20 |
| *(d)* | |
| Hexamethoxymethylmelamine | 5 |
| 3,4-epoxycyclohexylmethyl - 3,4 - epoxycyclohexanecarboxylate | 45 |
| "Pluronic" L–63 surfactant | 20 |
| "Solvesso 100" hydrocarbon solvent | 30 |
| *(e)* | |
| Hexamethoxymethylmelamine | 40 |
| 3,4-epoxycyclohexylmethyl - 3,4 - epoxycyclohexanecarboxylate | 20 |
| "Epoxol" 9–5 epoxidized vegetable oil plasticizer | 20 |
| "Pluronic" L–61 surfactant | 20 |
| *(f)* | |
| Hexamethoxymethylmelamine | 25 |
| 3,4-epoxy-6-methylcyclohexylmethyl-3,4 - epoxy - 6-methylcyclohexanecarboxylate | 35 |
| "Epoxol" 9–5 epoxidized vegetable oil plasticizer | 20 |
| "Igepal" CO–710 surfactant | 20 |
| *(g)* | |
| Hexaethoxymethylmelamine | 60 |
| Bis-(2,3-epoxy-6-methylcyclohexylmethyladipate | 30 |
| "Pluronic" L–61 surfactant | 10 |
| *(h)* | |
| Hexamethoxymethylmelamine | 50 |
| 3-(3,4-epoxycyclohexyl)-9,10-epoxy - 2,4 - dioxapiro [5.6]undecane | 40 |
| "Pluronic" L–63 surfactant | 10 |
| *(i)* | |
| Hexamethoxymethylmelamine | 75 |
| 3,4-epoxycyclohexylmethyl - 3,4-epoxycyclohexanecarboxylate | 15 |
| "Pluronic" L–61 surfactant | 10 |
| *(j)* | |
| Hexamethoxymethylmelamine | 50 |
| 3,4-epoxy-6-methylcyclohexylmethyl-3,4 - epoxy - 6-methylcyclohexanecarboxylate | 40 |
| "Pluronic" L–63 surfactant | 10 |
| *(k)* | |
| Hexamethoxymethylmelamine | 40 |
| 3,4-epoxycyclohexylmethyl-3,4 - epoxycyclohexanecarboxylate | 40 |
| Nonylphenoxypolyethyleneoxyethanol | 20 |

COLOR CONCENTRATES AND EXTENDERS

The binder composition of the present invention is utilized with color concentrates or stabilized pigment dispersions of commonly used pigments such as carbon black, titanium dioxide, phthalocyanine green, phthalocyanine blue, benzidine yellow AAOT, dianisidine orange, azo red ITR, and the like. Typical of these color concentrates is the following:

| | Percent |
|---|---|
| Phthalocyanine blue pigment | 15.0 |
| Water | 57.6 |
| Sodium laurylsulfate | 2.8 |
| Sodium diisopropylnaphthalenesulfate | 2.4 |
| Casein | 1.5 |
| Methyl cellulose 15 c.p.s. | 1.5 |
| Butylated melamine formaldehyde resin | 7.5 |
| Antifoam agent | 0.2 |
| Xylol | 7.5 |
| Mineral spirits | 4.0 |

Numerous other color concentrate compositions known to the art may also be employed.

In addition, an extender is employed in preparing the actual printing or coloring composition. A typical extender may be composed of about 46% water, about 52% mineral spirits and 2% of an extender concentrate. The following is typical of such an extender concentrate:

| | Parts |
|---|---|
| Methyl cellulose | 14.0 |
| Mineral spirits and xylol | 23.0 |
| Butylated melamine formaldehyde resin | 12.0 |
| Ammonium laurylsulfate | 7.5 |
| Sodium laurylsulfate | 10.0 |
| Water | 30.0 |
| Ammonium hydroxide | 2.0 |
| Casein | 1.5 |

Example 1

A print paste is prepared by thoroughly mixing the following composition:

| | Parts |
|---|---|
| Phthalocyanine blue color concentrate | 20 |
| 42% aqueous emulsion interpolymer (*b*) | 15 |
| Crosslinking composition (*g*) | 2 |
| Printing extender | 63 |

Prints are made with the above paste on 80 x 80 cotton, a blend of cotton and Dacron polyester and nylon parachute cloth. All are cured at 280° F. for 3 minutes and all exhibit a high brilliance, good handle, exceptional wash fastness in the AATCC No. 3 and 3A wash tests, and very good wet and dry crockfastness.

Example 2

A padding liquor for pigment dyeing is prepared by thoroughly mixing the following:

| | Parts |
|---|---|
| Phthalocyanine green pigment dispersion | 5 |
| 48% aqueous emulsion of interpolymer (*b*) | 4 |
| Crosslinking composition (*j*) | .06 |
| 2% aqueous sodium alginate solution | 2.5 |
| 30% aqueous diammonium phosphate | 2.8 |
| Water | 85.7 |

Cotton fabric is padded with this liquor to a pick-up of 60% and dry cured at 250° F. for 3 minutes. The resultant green fabric demonstrates excelent wash fastness in the AATCC No. 3A wash test.

Example 3

A print paste is prepared by thoroughly mixing the following:

| | Parts |
|---|---|
| Azo red color concentrate | 30 |
| 45% aqueous emulsion of interpolymer (*d*) | 15 |
| Crosslinking composition (*e*) | 3 |
| Printing extender | 52 |

Roller prints on a blend of cotton and Dacron polyester, and rayon challis with the above paste exhibit excellent fastness properties upon being cured at 190° to 240° F. for 2½ minutes.

Example 4

An aqueous impregnation dispersion is prepared by thoroughly blending the following:

| | Parts |
|---|---|
| 40% aqueous emulsion of interpolymer (k) | 40 |
| Crosslinking composition (i) | 1.5 |
| t-Octylphenoxypolyethoxyethanol | 1 |
| Ammonium chloride | 1 |
| Water | 56.5 |

A random web of equal parts of rayon, acetate and nylon weighing 4 oz./yd. is impregnated with the above dispersion and dried for 3 minutes at 310° F. The nonwoven demonstrates about 40% pick-up and exhibits a textile hand. It is porous and exceptionally coherent.

Example 5

A screen print paste is prepared by thoroughly mixing the following:

| | Parts |
|---|---|
| Crabon black pigment dispersion | 10 |
| 40% aqueous emulsion interpolymer (e) | 10 |
| Crosslinking composition (k) | 1.5 |
| Screen print extender | 78.5 |

Screen prints are made on scoured bleached burlap which is then cured at 180–200° F. for 2 minutes. The material exhibited good wash and dry cleaning fastness.

What is claimed is:

1. A heat-curable resinous composition comprising:
   (a) at least one interpolymer composed of
      (1) from about 25 to about 55%, by weight, of styrene,
      (2) from about 45 to about 75%, by weight, of at least one alkyl acrylate having from 7 to 15 carbon atoms, and
      (3) from about 0.5 to about 10%, by weight, of least one reactive acrylic,
   said interpolymer having a glass transition temperature of from about −20 to about +5° C., and
   (b) from about 0.5 to about 30%, by weight of interpolymer, of a mixture consisting of
      (1) a polycycloaliphatic polyepoxide, each cycloaliphatic ring of which contains from 5 to 6 carbon atoms and at least one epoxide group and
      (2) from about 10 to about 90%, by weight of said mixture, of a triazine of the formula:

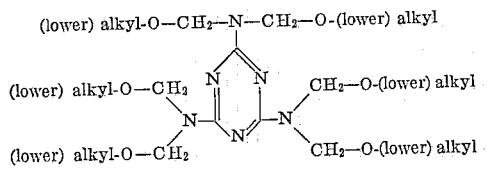

2. A composition according to claim 1 wherein the triazine is hexamethoxymethylmelamine.

3. A heat-curable resinous composition comprising:
   (a) at least one interpolymer composed of
      (1) from about 27 to about 50%, by weight, of styrene,
      (2) from about 47 to about 70%, by weight, of at least one alkyl acrylate selected from the group consisting of butyl acrylate and 2-ethylhexyl acrylate and
      (3) from about 0.5 to about 3%, by weight, of at least one reactive acrylic selected from the group consisting of hydroxyalkyl acrylate, methacrylic acid, glycidyl methacrylate, N-methylolacrylamide and alkoxymethylacrylamide
   said interpolymer having a glass transition temperature of from about −20 to about +5° C., and
   (b) from about 0.5 to about 10%, by weight of interpolymer, of a mixture consisting of
      (1) a polycycloaliphatic polyepoxide, each cycloaliphatic ring of which contains from 5 to 6 carbon atoms and at least one expoxide group, and
      (2) from about 40 to about 60%, by weight of said mixture, of hexamethoxymethylmelamine.

4. A heat-curable resinous composition comprising:
   (a) an interpolymer composed of
      (1) from about 27 to about 50%, by weight, of styrene,
      (2) from about 47 to about 70%, by weight, of 2-ethylhexyl acrylate,
      (3) from about 0.5 to about 3%, by weight, of N-methylolacrylamide,
   said interpolymer having a glass transition temperature of from about −20 to about +5° C., and
   (b) from about 0.5 to about 10%, by weight of interpolymer, of a mixture consisting of
      (1) a polycycloaliphatic polyepoxide, each cycloaliphatic ring of which contains from 5 to 6 carbon atoms and at least one epoxide group, and
      (2) from about 40 to about 60%, by weight of said mixture, of hexamethoxymethylmelamine.

5. A heat-curable resinous composition comprising:
   (a) an interpolymer composed of
      (1) from about 27 to about 50%, by weight, of styrene,
      (2) from about 47 to about 70%, by weight, of 2-ethylhexyl acrylate, and
      (3) from about 0.5 to about 3%, by weight, of a mixture of methacrylic acid and methacrylamide,
   said interpolymer having a glass transition temperature of from about −20 to about +5° C., and
   (b) from about 0.5 to about 10%, by weight of interpolymer, of a mixture consisting of
      (1) a polycycloaliphatic polyepoxide, each cycloaliphatic ring of which contains from 5 to 6 carbon atoms and at least one epoxide group, and
      (2) from about 40 to about 60%, by weight of said mixture, of hexamethoxymethylmelamine.

6. A heat-curable resinous composition comprising:
   (a) an interpolymer composed of
      (1) about 42%, by weight, of styrene,
      (2) about 56%, by weight, of 2-ethylhexyl acrylate, and
      (3) about 2%, by weight, of N-methylolacrylamide,
   said interpolymer having a glass transition temperature of about −10° C., and
   (b) from about 0.5 to about 10%, by weight of interpolymer, of a mixture consisting of
      (1) a polycycloaliphatic polyepoxide, each cycloaliphatic ring of which contains from 5 to 6 carbon atoms and at least one epoxide group, and
      (2) from about 40 to about 60%, by weight of said mixture, of hexamethoxymethylmelamine.

7. A composition according to claim 6 wherein the polycycloaliphatic polyepoxide is 3,4-epoxy-6-methylcyclohexylmethyl 3,4-epoxy-6-methylcyclohexane carboxylate.

8. A composition according to claim 6 wherein the polycycloaliphatic polyepoxide is 3,4-epoxycyclohexylmethyl 3,4-epoxycyclohexanecarboxylate.

9. A composition according to claim 6 wherein the polycycloaliphatic polyepoxide is bis-(3,4-epoxy-6-methylcyclohexylmethyl) adipate.

10. A composition according to claim 6 wherein the polycycloaliphatic polyepoxide is bis-(2,3-epoxycyclopentyl)-ether.

11. A composition according to claim 6 wherein the polycycloaliphatic polyepoxide is 1,2-bis-(2,3-epoxycyclopentoxy)-ethane.

12. A composition according to claim 6 wherein the polycycloaliphatic polyepoxide is 3-(3,4-epoxycyclohexyl) 9,10-epoxy-2,4-dioxaspiro[5.6]undecane.

13. The method of decorating textiles consisting of
A. applying to a textile a composition comprising
   (1) a coloring agent
   (2) an extender and
   (3) a heat curable resinous composition of:
      (a) at least one aqueous emulsion interpolymer composed of
         (1) from about 25 to about 55% by weight, of styrene,
         (2) from about 45 to about 75%, by weight, of at least one alkyl acrylate having from 7 to 15 carbon atoms, and
         (3) from about 0.5 to about 10%, by weight, of at least one reactive acrylic,
      said interpolymer having a glass transition temperature of from about −20 to about +5° C., and
      (b) from about 0.5 to about 30%, by weight of interpolymer, of a mixture consisting of
         (1) a polycycloaliphatic polyepoxide, each cycloaliphatic ring of which contains from 5 to 6 carbon atoms and at least one epoxide group, and
         (2) from about 10 to about 90%, by weight of said mixture, of a triazine of the formula:

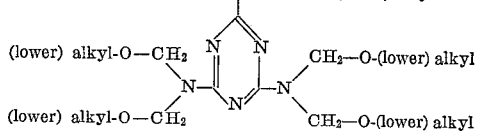

and
B. heating said textile at such a temperature and for such a period as to cure the composition thus applied.

14. The method of decorating textiles consisting of
A. applying to a textile a composition comprising
   (1) a pigment coloring agent
   (2) an extender and
   (3) a heat curable resinous composition of
      (a) at least one aqueous emulsion interpolymer composed of
         (1) from about 27 to about 50%, by weight, of styrene
         (2) from about 47 to about 70%, by weight, of at least one alkyl acrylate selected from the group consisting of butyl acrylate and 2-ethylhexyl acrylate and
         (3) from about 0.5 to about 3%, by weight, of at least one reactive acrylic selected from the group consisting of hydroxyalkyl acrylate, acrylic acid, methacrylic acid, glycidyl methacrylate, N-methylolacrylamide and alkoxy methylacrylamide,
      said interpolymer having a glass transition temperature of from about −20 to about +5° C., and
      (b) from about 0.5 to about 10%, by weight of interpolymer, of a mixture consisting of
         (1) a polycycloaliphatic polyepoxide, each cycloaliphatic ring of which contains from 5 to 6 carbon atoms and at least one epoxide group, and
         (2) from about 40 to about 60%, by weight of said mixture, of hexamethoxymethylmelamine, and
B. heating said textile at such a temperature and for such a period as to cure the composition thus applied.

15. The method of decorating textiles consisting of
A. applying to a textile a composition comprising
   (1) a pigment coloring agent
   (2) an extender and
   (3) a heat curable resinous composition of
      (a) at least one aqueous emulsion interpolymer composed of
         (1) about 42%, by weight, of styrene,
         (2) about 56%, by weight, of 2-ethylhexyl acrylate, and
         (3) about 2%, by weight, of N-methylolacrylamide,
      said interpolymer having a glass transition temperature of about −10° C., and
      (b) from about 0.5 to about 10%, by weight, of interpolymer, of a mixture consisting of
         (1) a polycycloaliphatic polyepoxide, each cycloaliphatic ring of which contains from 5 to 6 carbon atoms and at least one epoxide group, and
         (2) from about 40 to about 60%, by weight of said mixture, of hexamethoxymethylmelamine and
B. heating said textile at such a temperature and for such a period as to cure the composition thus applied.

No references cited.

JOSEPH L. SCHOFER, *Primary Examiner.*

H. WONG, *Assistant Examiner.*